United States Patent
Hegde

(10) Patent No.: US 12,490,122 B2
(45) Date of Patent: Dec. 2, 2025

(54) SYSTEMS AND METHODS FOR MACHINE LEARNING BASED DYNAMIC SELECTION OF DUAL CONNECTIVITY OR CARRIER AGGREGATION

(71) Applicant: Outdoor Wireless Networks LLC, Richardson, TX (US)

(72) Inventor: Harsha Hegde, Buffalo Grove, IL (US)

(73) Assignee: Outdoor Wireless Networks LLC, Richardson, TX (US)

( * ) Notice: Subject to any disclaimer, the term of this patent is extended or adjusted under 35 U.S.C. 154(b) by 329 days.

(21) Appl. No.: 18/349,826

(22) Filed: Jul. 10, 2023

(65) Prior Publication Data
US 2024/0015532 A1 Jan. 11, 2024

Related U.S. Application Data

(60) Provisional application No. 63/388,166, filed on Jul. 11, 2022.

(51) Int. Cl.
*H04W 24/02* (2009.01)
*H04W 76/15* (2018.01)

(52) U.S. Cl.
CPC ........... *H04W 24/02* (2013.01); *H04W 76/15* (2018.02)

(58) Field of Classification Search
CPC ............................. H04W 24/02; H04W 76/15
See application file for complete search history.

*Primary Examiner* — Gbemileke J Onamuti
(74) *Attorney, Agent, or Firm* — Fogg & Powers LLC

(57) ABSTRACT

Systems and methods for machine learning based dynamic selection of dual connectivity or carrier aggregation are provided. In an example, a system includes BBU(s), RU(s) communicatively coupled to the BBU(s), and antenna(s) communicatively coupled to the RU(s). Each respective RU of the RU(s) is communicatively coupled to a respective subset of the antenna(s). The BBU(s), the RU(s), and the antenna(s) are configured to implement a base station for wirelessly communicating with user equipment. The system further includes a machine learning computing system configured to receive time data and traffic data, and determine a predicted mode of operation for a UE based on the time data and the traffic data. Component(s) of the system are configured to receive a request from the UE, and dynamically select a dual connectivity mode or a carrier aggregation mode for operation of the UE based on the predicted mode of operation for the UE.

20 Claims, 6 Drawing Sheets

ENDC vs. CA combinations

| ENDC or CA | Description |
|---|---|
| 0 | EN-DC |
| 1 | CA LTE |
| 2 | CA NR |
| 3 | CA NR + CA LTE |

Categorical value

FIG. 2

SYSTEMS AND METHODS FOR MACHINE LEARNING BASED DYNAMIC SELECTION OF DUAL CONNECTIVITY OR CARRIER AGGREGATION

CROSS-REFERENCE TO RELATED APPLICATION

This application claims priority to U.S. Provisional Application No. 63/388,166, filed on Jul. 11, 2022, and titled "SYSTEMS AND METHODS FOR MACHINE LEARNING BASED DYNAMIC SELECTION OF DUAL CONNECTIVITY OR CARRIER AGGREGATION," the contents of which are incorporated by reference herein in their entirety.

BACKGROUND

A centralized or cloud radio access network (C-RAN) is one way to implement base station functionality. Typically, for each cell (that is, for each physical cell identifier (PCI)) implemented by a C-RAN, one or more baseband unit (BBU) entities (also referred to here simply as "BBUs") interact with multiple remote units (also referred to here as "RUs," "radio units," "radio points," or "RPs") to implement a base station entity in order to provide wireless service to various items of user equipment (UEs). The BBU entities may comprise a single entity (sometimes referred to as a "baseband controller" or simply a "baseband band unit" or "BBU") that performs Layer-3, Layer-2, and some Layer-1 processing for the cell. The BBU entities may also comprises multiple entities, for example, one or more central unit (CU) entities that implement Layer-3 and non-time critical Layer-2 functions for the associated base station and one or more distribution units (DU) that implement the time critical Layer-2 functions and at least some of the Layer-1 (also referred to as the Physical Layer) functions for the associated base station. Each CU can be further partitioned into one or more user-plane and control-plane entities that handle the user-plane and control-plane processing of the CU, respectively. Each such user-plane CU entity is also referred to as a "CU-UP," and each such control-plane CU entity is also referred to as a "CU-CP." In this example, each RU is configured to implement the radio frequency (RF) interface and the physical layer functions for the associated base station that are not implemented in the DU. The multiple RUs are typically located remotely from each other (that is, the multiple RUs are not co-located), and the BBU entities are communicatively coupled to the RUs over a fronthaul network. The RUs may also be collocated (for example, in instances where each RU processes different carriers or time slices).

Evolved Universal Terrestrial Radio Access Network (E-UTRAN) comprises one or more base stations that wirelessly communicate with UEs such as smartphones using licensed radio frequency spectrum and the Long-Term Evolution (LTE) protocol. The base station of E-UTRAN is called an Evolved Node B (also generally referred to as "eNodeB" or "eNB"). When the eNB connects to the Evolved Packet Core (EPC), it is referred to as an eNB. When the eNB connects to the Fifth Generation Core (5GC), it is referred to as an ng-eNB.

Next Generation Radio Access Network (NG-RAN) comprises one or more base stations that wirelessly communicate with UEs such as smartphones using licensed radio frequency spectrum and the New Radio (NR) protocol. The base station of NG-RAN is called a Next Generation Node B (also generally referred to as a "gNodeB" or "gNB"). When the gNB connects to the EPC, it is referred to as an en-gNB. When the gNB connects to the 5GC, it is referred to as a gNB.

3rd Generation Partnership Project (3GPP) provides for a dual connectivity mode of operation where a UE may be configured to utilize resources provided by two different RAN nodes connected via a non-ideal backhaul. A RAN node that handles control plane connectivity of the UE to the core network is referred to as a Master Node (MN) and the other RAN node is referred to as a Secondary Node (SN).

There are multiple types of dual connectivity. One type of dual connectivity is called Intra-E-UTRA Dual Connectivity (DC), which includes an MN and SN that both provide E-UTRA access. For DC, the MN is called an MeNB, and the SN is called an SeNB. Another type of dual connectivity is generally called Multi-Radio Dual Connectivity (MR-DC), which includes one of the RAN nodes providing NR access and the other RAN node providing either E-UTRA or NR access. There are a number of specific types of MR-DC that depend on how the RAN nodes connect to the core network.

One type of MR-DC includes the MN of the UE being connected to EPC core network and the involved core network entity is the mobility management entity (MME). This type of MR-DC is referred to as E-UTRA-NR Dual Connectivity (EN-DC). EN-DC specifically includes an MN providing E-UTRA access connected to an EPC core network and SN is providing NR access. The MN is called an MeNB, and the SN is called an SgNB or en-gNB. For EN-DC, the MN uses the S1-C protocol for control plane communication with MME. The MN and SN may use the S1-U protocol for user plane communication with SGW of EPC. The MN and SN communicate using the X2-C protocol for control plane and the X2-U protocol for user plane.

Other types of MR-DC include the MN of the UE being connected to the 5GC, and the involved core network entity is the Access and Mobility Function (AMF). The MN uses the NG-C protocol for control plane communication with AMF. The MN and SN may use the NG-U protocol for user plane communication with a User Plane Function (UPF) of 5GC. The MN and SN communicate using the Xn-C protocol for control plane and the Xn-U protocol for user plane.

One type of MR-DC using the 5GC is called NR-E-UTRA Dual Connectivity (NE-DC), which includes an MN providing NR access to a UE that is connected to the 5GC and an SN providing E-UTRA access to the UE. Another type of MR-DC using the 5GC is called NG-RAN E-UTRA-NR Dual Connectivity (NGEN-DC), which includes an MN providing E-UTRA access to a UE that is connected to the 5GC and an SN providing NR access to the UE. Yet another type of MR-DC using the 5GC is called NR-NR Dual Connectivity (NR-DC), which includes an MN providing NR access to a UE that is connected to 5GC and an SN also providing NR access to the UE.

When a UE connects to an MN providing E-UTRA access to utilize the services of EPC core network and connects to an SN providing NR access, it is said to be in Non-Stand Alone (NSA) mode. EN-DC is an example of NSA mode of operation. When a UE connects to an MN providing NR access to utilize the services of 5GC core network, it is said to be in Stand Alone (SA) mode. A UE in SA mode may or may not use MR-DC. Types of MR-DC allowed for a UE in SA mode are NE-DC and NR-DC.

SUMMARY

In some aspects, a system includes at least one baseband unit (BBU), one or more radio units communicatively coupled to the at least one BBU, and one or more antennas communicatively coupled to the one or more radio units. Each respective radio unit of the one or more radio units is communicatively coupled to a respective subset of the one or more antennas. The at least one BBU, the one or more radio units, and the one or more antennas are configured to implement a base station for wirelessly communicating with user equipment. The system further includes a machine learning computing system configured to receive time data and traffic data, and determine a predicted mode of operation for a first user equipment based on the time data and the traffic data. One or more components of the system are configured to receive a request from the first user equipment, and dynamically select a dual connectivity mode or a carrier aggregation mode for operation of the first user equipment based on the predicted mode of operation for the first user equipment.

In some aspects, a method includes receiving time data and traffic data, and receiving a request from a first user equipment at a base station. The base station includes at least one baseband unit (BBU), one or more radio units communicatively coupled to the at least one BBU, and one or more antennas communicatively coupled to the one or more radio units. Each respective radio unit of the one or more radio units is communicatively coupled to a respective subset of the one or more antennas. The at least one BBU, the one or more radio units, and the one or more antennas are configured to implement the base station for wirelessly communicating with the first user equipment. The method further includes determining a predicted mode of operation for the first user equipment based on the time data and the traffic data. The method further includes selecting a dual connectivity mode or a carrier aggregation mode for operation of the first user equipment based on the predicted mode of operation for the first user equipment.

In some aspects, a radio access network includes a first base station including a first baseband unit (BBU), and a second base station including a second baseband unit (BBU). The radio access network further includes one or more radio units communicatively coupled to the first BBU and the second BBU, and one or more antennas communicatively coupled to the one or more radio units. Each respective radio unit of the one or more radio units is communicatively coupled to a respective subset of the one or more antennas. The radio access network further includes a machine learning computing system configured to receive time data and traffic data, and determine a predicted mode of operation for a first user equipment based on the time data and the traffic data. One or more components of the radio access network are configured to receive a request from the first user equipment, and dynamically select a dual connectivity mode or a carrier aggregation mode for the first user equipment based on the predicted mode of operation for the first user equipment.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which:

FIG. 2 is a diagram of example variables for machine learning model;

Figure 1A:
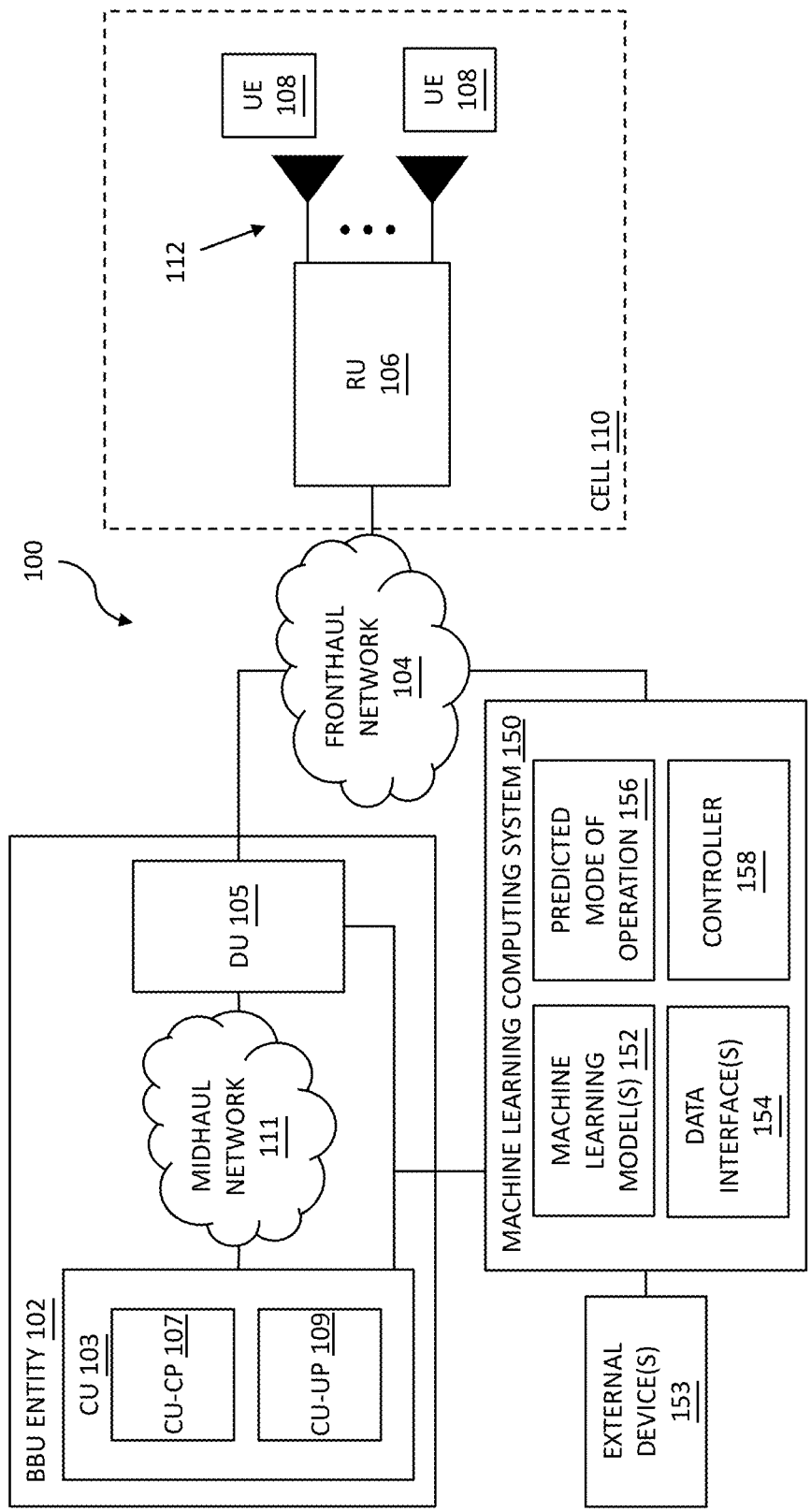
FIGS. 1A-1C are block diagrams illustrating example radio access networks.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be used and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

In 5G NR campus and venue networks, the network determines the mode of operation to use for communicating with a UE. Assuming that the UE is capable of both operations, the network can determine whether to use dual connectivity or carrier aggregation in order to improve performance (for example, improve throughput) for the UE. In general, carrier aggregation modes provide higher performance, higher throughput, and lower latency compared to dual connectivity modes. Typically, the selection of a dual connectivity split bearer or carrier aggregation is based on static configuration based on predetermined prioritization. For example, a carrier or operator selects whether to prioritize dual connectivity or carrier aggregation, and the higher priority mode of operation is selected for UEs on a first-come, first-served basis. In some situations, the selection can be dynamically performed based on a few vendor-specific parameters (for example, bandwidth for LTE/NR, QAM, or the like). The current techniques based on static configurations and limited dynamic selection result in inefficient utilization of resources and lower performance for UEs.

The problems described above involve 5G NR systems, but a similar problem exists in LTE. Therefore, although the following embodiments are primarily described as being implemented for use to provide 5G NR service, it is to be understood the techniques described here can be used with other wireless interfaces (for example, 4G LTE service) and references to "gNB" can be replaced with the more general term "base station" or "base station entity" and/or a term particular to the alternative wireless interfaces (for example, "enhanced NodeB" or "eNB"). Furthermore, although the following embodiments are primarily described as being implemented for non-standalone modes, it is also to be understood that 5G NR embodiments can be used in both standalone and non-standalone modes (or other modes developed in the future), and the following description is not intended to be limited to any particular mode. Also, unless explicitly indicated to the contrary, references to "layers" or a "layer" (for example, Layer-1, Layer-2, Layer-3, the Physical Layer, the MAC Layer, etc.) set forth herein refer to layers of the wireless interface (for example, 5G NR or 4G LTE) used for wireless communication between a base station and user equipment).

FIG. 1A is a block diagram illustrating an example radio access network 100 in which the techniques for dynamically selecting a mode of operation for user equipment described herein can be implemented. In the particular example shown in FIG. 1A, the radio access network 100 includes one or more baseband unit (BBU) entities 102 communicatively coupled to a RU 106 via a fronthaul network 104. The radio access network 100 provides wireless service to various items of user equipment (UEs) 108 in a cell 110. Each BBU entity 102 can also be referred to simply as a "BBU."

In the example shown in FIG. 1A, the one or more BBU entities 102 comprise one or more central units (CUs) 103 and one or more distributed units (DUs) 105. Each CU 103 implements Layer-3 and non-time critical Layer-2 functions for the associated radio access network 100. Each DU 105 is configured to implement the time critical Layer-2 functions and at least some of the Layer-1 (also referred to as the Physical Layer) functions for the associated radio access network 100. Each CU 103 can be further partitioned into one or more control-plane and user-plane entities 107, 109 that handle the control-plane and user-plane processing of the CU 103, respectively. Each such control-plane CU entity 107 is also referred to as a "CU-CP" 107, and each such user-plane CU entity 109 is also referred to as a "CU-UP" 109.

The RU 106 is configured to implement the control-plane and user-plane Layer-1 functions not implemented by the DU 105 as well as the radio frequency (RF) functions. The RU 106 is typically located remotely from the one or more BBU entities 102. In the example shown in FIG. 1A, the RU 106 is implemented as a physical network function (PNF) and is deployed in or near a physical location where radio coverage is to be provided in the cell 110. In the example shown in FIG. 1A, the RU 106 is communicatively coupled to the DU 105 using a fronthaul network 104. In some examples, the fronthaul network 104 is a switched Ethernet fronthaul network (for example, a switched Ethernet network that supports the Internet Protocol (IP)).

The RU 106 includes or is coupled to a set of antennas 112 via which downlink RF signals are radiated to UEs 108 and via which uplink RF signals transmitted by UEs 108 are received. In some examples, the set of antennas 112 includes two or four antennas. However, it should be understood that the set of antennas 112 can include two or more antennas 112. In one configuration (used, for example, in indoor deployments), the RU 106 is co-located with its respective set of antennas 112 and is remotely located from the one or more BBU entities 102 serving it. In another configuration (used, for example, in outdoor deployments), the antennas 112 for the RU 106 are deployed in a sectorized configuration (for example, mounted at the top of a tower or mast). In such a sectorized configuration, the RU 106 need not be co-located with the respective sets of antennas 112 and, for example, can be located at the base of the tower or mast structure, for example, and, possibly, co-located with its serving one or more BBU entities 102.

While the example shown in FIG. 1A shows a single CU-CP 107, a single CU-UP 109, a single DU 105, and a single RU 106 for the radio access network 100, it should be understood that this is an example and other numbers of BBU entities, components of the BBU entities, and/or RUs can also be used.

Figure 1B:
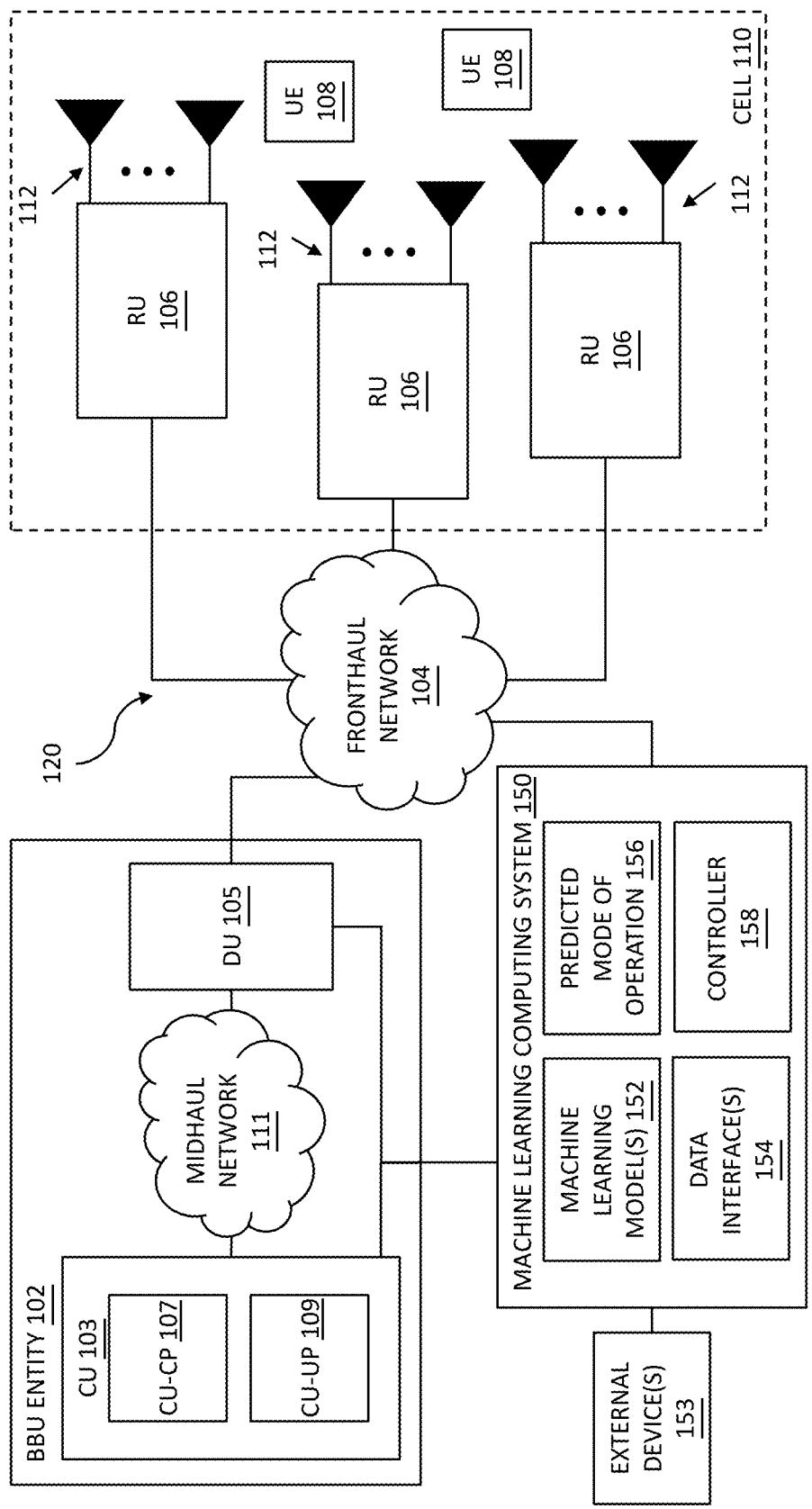

FIG. 1B is a block diagram illustrating an example radio access network 120 in which the techniques for dynamically selecting a mode of operation for user equipment described herein can be implemented. In the particular example shown in FIG. 1B, the radio access network 120 includes one or more BBU entities 102 communicatively coupled to multiple RUs 106 via a fronthaul network 104. The radio access network 120 provides wireless service to various UEs 108 in a cell 110. Each BBU entity 102 can also be referred to simply as a "BBU."

In the example shown in FIG. 1B, the one or more BBU entities 102 comprise one or more CUs 103 and one or more DUs 105. Each CU 103 implements Layer-3 and non-time critical Layer-2 functions for the associated radio access network 100. Each DU 105 is configured to implement the time critical Layer-2 functions and at least some of the Layer-1 (also referred to as the Physical Layer) functions for the associated radio access network 120. Each CU 103 can be further partitioned into one or more control-plane and user-plane entities 107, 109 that handle the control-plane and user-plane processing of the CU 103, respectively. Each such control-plane CU entity 107 is also referred to as a "CU-CP" 107, and each such user-plane CU entity 109 is also referred to as a "CU-UP" 109.

The RUs 106 are configured to implement the control-plane and user-plane Layer-1 functions not implemented by the DU 105 as well as the radio frequency (RF) functions. Each RU 106 is typically located remotely from the one or more BBU entities and located remotely from other RUs 106. In the example shown in FIG. 1B, each RU 106 is implemented as a physical network function (PNF) and is deployed in or near a physical location where radio coverage is to be provided in the cell 110. In the example shown in FIG. 1B, the RUs 106 are communicatively coupled to the DU 105 using a fronthaul network 104. In some examples, the fronthaul network 104 is a switched Ethernet fronthaul network (for example, a switched Ethernet network that supports the Internet Protocol (IP)).

Each of the RUs 106 includes or is coupled to a respective set of antennas 112 via which downlink RF signals are radiated to UEs 108 and via which uplink RF signals transmitted by UEs 108 are received. In some examples, each set of antennas 112 includes two or four antennas. However, it should be understood that each set of antennas 112 can include two or more antennas 112. In one configuration (used, for example, in indoor deployments), each RU 106 is co-located with its respective set of antennas 112 and is remotely located from the one or more BBU entities 102 serving it and the other RUs 106. In another configuration (used, for example, in outdoor deployments), the sets of antennas 112 for the RUs 106 are deployed in a sectorized configuration (for example, mounted at the top of a tower or mast). In such a sectorized configuration, the RUs 106 need not be co-located with the respective sets of antennas 112 and, for example, can be located at the base of the tower or mast structure, for example, and, possibly, co-located with the serving one or more BBU entities 102. Other configurations can be used.

Figure 1C:
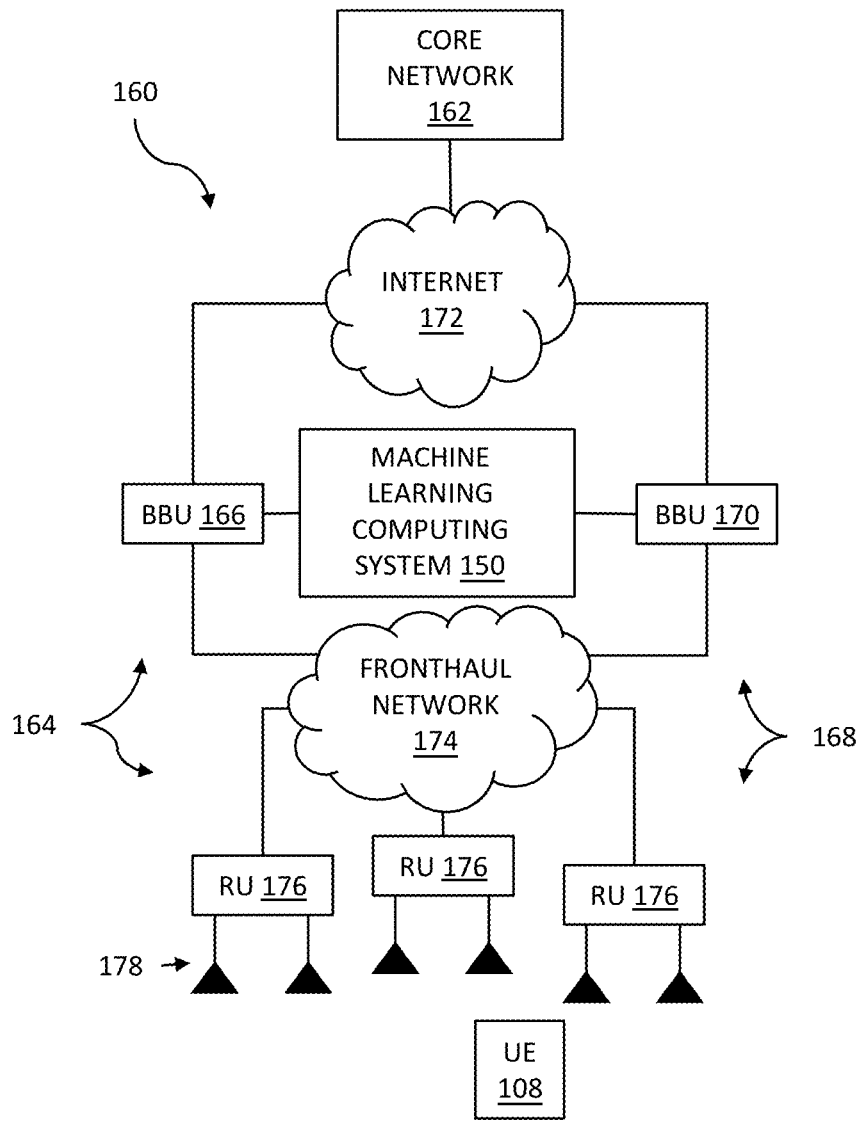

FIG. 1C is a block diagram of one exemplary embodiment of a wireless system in which the techniques for dynamically selecting a mode of operation for user equipment described herein can be used. In the example shown in FIG. 1C, the wireless system comprises a radio access network (RAN) 160 and a core network 162. In this example, the RAN 160 includes a master base station 164 (also referred to as a Master Node (MN)) and a secondary base station 168 (also referred to herein as a Secondary Node (SN)) that are used to provide UEs 108 with mobile access to the wireless network operator's core network 162 in order to enable the user equipment 108 to wirelessly communicate data and voice. In some examples, the master base station 164 and the secondary base station 168 are configured to operate in a non-standalone mode. In some examples, the master base station 164 and the secondary base station 168 are configured to operate in a Multi-Radio Dual Connectivity (MR-DC) mode as defined by 3GPP standard TS 37.340. The master base station 164 is the radio access node that provides both a control-plane connection and a user-plane connection to the core network 162. The secondary base station 168 is the radio access node with no control-plane connection to the core network 162 that provides additional user-plane resources to the UE 108.

In some examples, the master base station 164 is an LTE base station (also referred to herein as "LTE Evolved Node B," "eNodeB," or "eNB") and the secondary base station 168 is a 5G base station (also referred to herein as "Next Generation Node B," "gNodeB," or "gNB"). In other examples, the master base station 164 is a 5G base station and the secondary base station is an LTE base station. In other examples, the master base station 164 is a 5G base station and the secondary base station is also a 5G base station.

In the example shown in FIG. 1C, the core network 162 includes a Security Gateway (SeGW). In some examples, the core network 162 is implemented as an Evolved Packet Core (EPC) comprising standard LTE EPC network elements. In other examples, the core network 162 is implemented as a 5G Core (5GC) comprising standard 5GC network elements.

In the example shown in FIG. 1C, the back-haul between the RAN 160 and the core network 162 is implemented using one or more IP networks (including, in this example, the Internet 172).

In examples where the core network 162 is implemented as an EPC, the master base station 164 communicates with components in the core network 162 using the S1 interface and communicates with the secondary base station 168 using the X2 interface. In such examples, the secondary base station 168 communicates with components in the core network 162 using the S1-U interface and communicates with the master base station 164 using the X2 interface. In examples where the core network 162 is implemented as a 5GC, the master base station 164 communicates with components in the core network 162 using the NG interface and communicates with the secondary base station 168 using the Xn interface. In such examples, the secondary base station 168 communicates with components in the core network 162 using the NG-U interface and communicates with the master base station 164 using the Xn interface.

Each master base station 164 can be implemented using one or more baseband unit (BBU) entities 166 (also referred to herein simply as "BBUs") that interact with multiple remote units 176 (also referred to here as "RUs," "radio units," "radio points," or "RPs") to implement the various base-station functions necessary to implement the air-interface and to interact with the core network 162 in order to provide wireless service to various items of user equipment (UEs). In examples where the master base station 164 is an LTE base station, the one or more BBU entities 166 may comprise a single entity (sometimes referred to as a "baseband controller" or simply a "baseband band unit" or "BBU") that performs Layer-3, Layer-2, and some Layer-1 processing for the cell. In this example, each RU 176 is configured to implement the radio frequency (RF) interface and the physical layer functions for the associated base station that are not implemented in the controller. The multiple RUs 176 are typically located remotely from each other (that is, the multiple RUs are not co-located), and the one or more BBU entities 166 are communicatively coupled to the RUs 176 over a fronthaul network 174. In some examples, the fronthaul network 174 is a switched Ethernet fronthaul network (for example, a switched Ethernet network that supports the Internet Protocol (IP)).

In examples where the master base station 164 is a 5G base station, the one or more BBU entities 166 may also comprises multiple entities, for example, one or more central unit (CU) entities that implement Layer-3 and non-time critical Layer-2 functions for the associated base station and one or more distribution units (DU) that implement the time critical Layer-2 functions and at least some of the Layer-1 (also referred to as the Physical Layer) functions for the associated base station. Each CU can be further partitioned into one or more user-plane and control-plane entities that handle the user-plane and control-plane processing of the CU, respectively. Each such user-plane CU entity is also referred to as a "CU-UP," and each such control-plane CU entity is also referred to as a "CU-CP." In this example, each RU 176 is configured to implement the radio frequency (RF) interface and the physical layer functions for the associated base station that are not implemented in the DU. The multiple RUs 176 are typically located remotely from each other (that is, the multiple RUs are not co-located), and the one or more BBU entities 166 are communicatively coupled to the RUs 176 over a fronthaul network 174. In some examples, the fronthaul network 174 is a switched Ethernet fronthaul network (for example, a switched Ethernet network that supports the Internet Protocol (IP)).

Similarly, each secondary base station 168 can be implemented using one or more baseband unit (BBU) entities 170 (also referred to herein simply as "BBUs") that interact with multiple remote units 176 (also referred to here as "RUs," "radio units," "radio points," or "RPs") to implement the various base-station functions necessary to implement the air-interface and to interact with the core network 162 in order to provide wireless service to various items of user equipment (UEs). In examples where the secondary base station 168 is an LTE base station, the one or more BBU entities 170 may comprise a single entity (sometimes referred to as a "baseband controller" or simply a "baseband band unit" or "BBU") that performs Layer-3, Layer-2, and some Layer-1 processing for the cell. In this example, each RU 176 is configured to implement the radio frequency (RF) interface and the physical layer functions for the associated base station that are not implemented in the controller. The multiple RUs 176 are typically located remotely from each other (that is, the multiple RUs are not co-located), and the one or more BBU entities 170 are communicatively coupled to the RUs 176 over a fronthaul network 174. In some examples, the fronthaul network 174 is a switched Ethernet fronthaul network (for example, a switched Ethernet network that supports the Internet Protocol (IP)).

In examples where the secondary base station 168 is a 5G base station, the one or more BBU entities 170 may also comprises multiple entities, for example, one or more central unit (CU) entities that implement Layer-3 and non-time critical Layer-2 functions for the associated base station and one or more distribution units (DU) that implement the time critical Layer-2 functions and at least some of the Layer-1 (also referred to as the Physical Layer) functions for the associated base station. Each CU can be further partitioned into one or more user-plane and control-plane entities that handle the user-plane and control-plane processing of the CU, respectively. Each such user-plane CU entity is also referred to as a "CU-UP," and each such control-plane CU entity is also referred to as a "CU-CP." In this example, each RU 176 is configured to implement the radio frequency (RF) interface and the physical layer functions for the associated base station that are not implemented in the DU. The multiple RUs 176 are typically located remotely from each other (that is, the multiple RUs are not co-located), and the one or more BBU entities 170 are communicatively coupled to the RUs 176 over a fronthaul network 174. In some examples, the fronthaul network 174 is a switched Ethernet fronthaul network (for example, a switched Ethernet network that supports the Internet Protocol (IP)).

Each RU 176 includes or is coupled to one or more antennas 178 via which downstream radio frequency signals are radiated to UEs 108 and via which upstream radio frequency signals transmitted by user equipment 108 are received. In some examples, the one or more antennas 178 includes two or four antennas 178. In one configuration (used, for example, in indoor deployments), the RUs 176 are co-located with respective antennas 178 and remotely located from the one or more BBU entities 166, 170 serving it. In another configuration (used, for example, in outdoor deployments), the antennas 178 for the RUs 176 are deployed in a sectorized configuration (for example, mounted at the top of a tower or mast). In such a sectorized configuration, the RUs 176 need not be co-located with the respective antennas 178 and, for example, can be located at the base of the tower or mast structure, for example, and, possibly, co-located with its serving one or more BBU entities 166, 170.

In the example shown in FIG. 1C, the master base station 164 and the secondary base station 168 are implemented using the same RUs 176 and antennas 178. That is, the master base station 164 and the secondary base station 168 share RUs 176 and antennas 178. In other examples, the master base station 164 is implemented using respective RUs 176 and antennas 178 that are different than the RUs 176 and antennas 178 used to implement the secondary base station 168.

In the example shown in FIG. 1C, only one master base station 164 and only one secondary base station 168 are shown. It should be understood that a different number of master base stations 164 and/or secondary base stations 168 could be used to implement the RAN 160.

The radio access networks 100, 120, 160 that include the components shown in FIGS. 1A-1C can be implemented using a scalable cloud environment in which resources used to instantiate each type of entity can be scaled horizontally (that is, by increasing or decreasing the number of physical computers or other physical devices) and vertically (that is, by increasing or decreasing the "power" (for example, by increasing the amount of processing and/or memory resources) of a given physical computer or other physical device). The scalable cloud environment can be implemented in various ways. For example, the scalable cloud environment can be implemented using hardware virtualization, operating system virtualization, and application virtualization (also referred to as containerization) as well as various combinations of two or more of the preceding. The scalable cloud environment can be implemented in other ways. In some examples, the scalable cloud environment is implemented in a distributed manner. That is, the scalable cloud environment is implemented as a distributed scalable cloud environment comprising at least one central cloud, at least one edge cloud, and at least one radio cloud.

In some examples, one or more components of the BBU entities 102, 166, 170 (for example, the CU 103, CU-CP 107, CU-UP 109, and/or DU 105) are implemented as a software virtualized entities that are executed in a scalable cloud environment on a cloud worker node under the control of the cloud native software executing on that cloud worker node. In some such examples, the DU 105 is communicatively coupled to at least one CU-CP 107 and at least one CU-UP 109, which can also be implemented as software virtualized entities. In some other examples, one or more components of the one or more BBU entities 102, 166, 170 (for example, the CU-CP 107, CU-UP 109, and/or DU 105) are implemented as a single virtualized entity executing on a single cloud worker node. In some examples, the at least one CU-CP 107 and the at least one CU-UP 109 can each be implemented as a single virtualized entity executing on the same cloud worker node or as a single virtualized entity executing on a different cloud worker node. However, it is to be understood that different configurations and examples can be implemented in other ways. For example, the CU 103 can be implemented using multiple CU-UPs 109 and using multiple virtualized entities executing on one or more cloud worker nodes. Moreover, it is to be understood that the CU 103 and DU 105 can be implemented in the same cloud (for example, together in a radio cloud or in an edge cloud). In some examples, the DU 105 is configured to be coupled to the CU-CP 107 and CU-UP 109 over a midhaul network 111 (for example, a network that supports the Internet Protocol (IP)). Other configurations and examples can be implemented in other ways.

As discussed above, there is a need for a better mechanism for dynamically selecting between a dual connectivity mode and carrier aggregation mode for operation of UEs 108 in networks. To help facilitate this for the radio access networks 100, 120, 160 a machine learning computing system 150 is communicatively coupled to one or more components of the radio access network 100, 120, 160. The machine learning computing system 150 is configured to predict a mode of operation for the UE 108, and one or more components of the radio access network 100, 120, 160 are configured to select a dual connectivity mode or a carrier aggregation mode for operation of the UE 108 based on the predicted mode of operation for the UE. The techniques described herein enable selection based on real-time patterns and needs, which leads to better utilization of resources and better performance for UEs 108.

In the examples shown in FIGS. 1A-1C, the machine learning computing system 150 is communicatively coupled to the BBUs 102, 166, 170. In some examples, the machine learning computing system 150 is communicatively coupled to the CU-CP 107, CU-UP 109, and/or the DU 105. It should be understood that the machine learning computing system 150 could also be communicatively coupled to different components, or combinations of components, in the radio access network 100, 120, 160. In some examples, the machine learning computing system 150 is a general-purpose computing device (for example, a server) equipped with at least one (and optionally more than one graphics processing unit (GPU) for faster machine-learning-based processing. In some examples, the machine learning computing system 150 is implemented in more than one physical housing, each with at least one GPU. The machine learning computing system 150 is a host for one or more machine learning models 152 that predict a mode of operation for the UEs 108. In some examples, the machine learning computing system 150 is communicatively coupled to and configured to serve a single radio access network. In other examples, the machine learning computing system 150 is communicatively coupled to and configured to serve multiple radio access networks. The number of radio access networks that the machine learning computing system 150 is communicatively coupled to can be determined based on deployment needs and scale.

In some examples, the machine learning computing system 150 includes one or more interfaces 154 configured to receive time data. The time data can include, for example, the current time of day, day of the week, and/or whether the current day is a holiday. In some examples, the time data is provided by one or more external devices 153 that are separate and distinct from the machine learning computing system 150. For example, the one or more external devices 153 configured to provide time data to the machine learning computing system 150 can be a tracker, sensor, or Internet-of-Things (IOT) device. In other examples, at least a portion of the time data is provided by an internal component of the machine learning computing system 150 (for example, an internal clock).

In some examples, the machine learning computing system 150 also includes one or more interfaces 154 configured to receive traffic data for the radio access network 100, 120, 160. The one or more interfaces 154 configured to receive traffic data can be the same interface(s) 154 or different interface(s) 154 compared to the one or more interfaces 154 configured to receive time data. The traffic data can include, for example, utilization data for LTE and/or NR resources. In some examples, the utilization data is a percentage of resources currently used compared to the total resources available for LTE and/or NR. In some examples, the utilization data is an indication of whether the percentage of resources currently used compared to the total resources available for LTE and/or NR is above a threshold. In some examples, the traffic data is provided to the machine learning computing system 150 by one or more components of the radio access network (for example, the BBUs). In other examples, the traffic data is provided to the machine learning computing system 150 by a device that is external to the radio access network (for example, from a core network communicatively coupled to the radio access network).

In some examples, the machine learning computing system 150 also includes one or more interfaces 154 configured to receive signal quality data from UEs 108. The signal quality data can include, for example, a signal-to-interference-plus-noise ratio (SINR) measurement, a received signal strength indicator (RSSI) measurement, or another measurement of signal quality at the user equipment. In some examples, the signal quality data is provided to the machine learning computing system 150 by one or more components of the RAN 100, 120, 160 (for example, the BBUs 102, 166, 170).

The machine learning computing system 150 includes a machine learning model 152 that is configured to determine a predicted mode of operation 156 for a UE 108. One or more components of the system are configured to dynamically select a dual connectivity mode or a carrier aggregation mode for operation of the UE 108 based on the predicted mode of operation 156 for the UE 108 determined by the machine learning model 152. In some examples, the one or more components of the system are configured to select a dual connectivity mode for operation of the UE 108 based on the predicted mode of operation 156, which involves the UE 108 communicating with multiple base stations in the radio access network. In some examples, the one or more components of the system are configured to select a carrier aggregation mode for operation of the UE 108 based on the predicted mode of operation 156, which involves the UE 108 receiving multiple carriers from one or more base stations in the radio access network.

In some examples, the machine learning computing system 150 is configured to provide control signals (for example, via controller 158) to the one or more components of the radio access network directly. In other examples, the predicted mode of operation 156 is output to a component of the system (for example, the BBUs 102, 166, 170), and the component of the system generates and provides control signals to the other components of the system for dynamically selecting (and implementing) a dual connectivity mode or a carrier aggregation mode for operation of the UE 108.

In some examples, the machine learning model 152 is a multinomial regression model, and the machine learning computing system 150 utilizes the time data and the traffic data as independent variables in a predictor function of the machine learning model 152. In some examples, the machine learning computing system 150 also utilizes the signal quality data and/or other information from the UE 108 (for example, a type of application being used, Quality of Service (QoS) requirements for the application, etc.) as independent variables in the predictor function of the machine learning model 152. The predicted mode of operation 156 for the UE 108 is the dependent variable in the predictor function of the machine learning model 152. Each independent variable in the predictor function is associated with a specific weight/coefficient determined via training and the weights/coefficients can be updated during operation of the system.

The time data (including current time of day and day of week) is encoded and used by the machine learning model 152 in a manner that does not apply a higher weight to a particular time of day by default (for example, where 11:00 AM is weighted higher than 10:00 AM by virtue of being associated with a larger number). In some examples, the time of day is divided into segments (for example, 15-minute increments) and the predictor function utilizes a binary variable for indicating that the current time falls within a particular segment. For example, a one can be used to indicate that the current time is within a particular time segment, and a zero can be used to indicate that the current time is not within a particular segment. Similarly, the predictor function can utilize a binary variable for indicating that the current day of the week is a particular day of the week. For example, a one can be used to indicate that the current day of the week is a particular day of the week, and a zero can be used to indicate that the current day of the week is not a particular day of the week.

In examples where the time data also includes information regarding whether the current day is a holiday, this information is also encoded and used by the machine learning model 152 in a manner that does not apply a higher weight to a particular holiday by default. In some examples, the information regarding whether the current day is a holiday can be indicated using a binary variable such that any day that is a holiday will be encoded as a first state (for example, using a one) and any day that is not a holiday will be encoded as the other state (for example, using a zero). In other examples, each specific holiday can be associated with a different independent variable that is binary in a manner similar to the time segments discussed above.

In some examples, the traffic data is encoded and used as multiple independent variables in the machine learning model 152. For example, where the traffic data includes a utilization data (either percentage or threshold) for LTE and NR resources, the utilization data for LTE and the utilization data for NR are input as separate independent variables. In other examples, the traffic data can be encoded in different ways. For example, where a radio access network includes multiple base stations of the same type (for example, eNB or gNB), the utilization data for each base station can be input as a separate independent variable.

In some examples, the signal quality data is encoded and used as one or more independent variables in the machine learning model 152. For example, the signal quality data for signals received from different base stations are input as separate independent variables.

In some examples, other information from the UE 108 is encoded and used as multiple independent variables in the machine learning model 152. For example, where the UE 108 provides information regarding a type of application being used by the UE and QoS requirements for the application (for example, in a request for service message), the type of application and the QoS requirements can be input as separate independent variables. In such examples, the other information is encoded and used by the machine learning model 152 in a manner that does not apply a higher weight to a particular type of application or QoS requirement by default. In some examples, the predictor function utilizes a binary variable for indicating that the type of application falls within a particular category. For example, a one can be used to indicate that the category of application is being used, and a zero can be used to indicate that the category of application is not being used. Similarly, the predictor function can utilize a binary variable for indicating that the QoS requirements fall within a particular category. For example, a one can be used to indicate that the category of QoS requirements applies to the application, and a zero can be used to indicate that the category of QoS requirements does not apply to the application.

In some examples, the predicted mode of operation 156 output by the machine learning model 152 includes a single mode of operation for the UE 108 that will meet real-time needs of the UE 108 and better utilize resources of the radio access network 100, 120, 160. In some examples, each different mode of operation for the UE 108 is encoded as a distinct output (dependent variable) of the predictor function of the machine learning model 152. In some examples, the output of the machine learning model 152 is an integer that corresponds to a particular mode of operation for the UE 108.

A simplified table of categorical values for different modes of operation for a non-standalone deployment is shown in FIG. 2. In the example shown in FIG. 2, the different values indicate whether a dual connectivity mode or a type of carrier aggregation mode is predicted for operation of the UE. In the example shown in FIG. 2, the dual connectivity mode is EN-DC, and the types of carrier aggregation modes include LTE, NR, or LTE and NR. In other examples, a different type of dual connectivity (for example, NGEN-DC, NE-DC, or NR-DC) and different combinations of carrier aggregation can be included as outputs depending on the modes supported by the radio access network.

While the different modes of operation for the UE 108 can be encoded as a numerical output, each categorical value represents additional information that is assumed in the machine learning model 152. In some examples, each value includes a prediction that an optimized level of performance for the UE 108 and utilization of resources for the RAN 100, 120, 160 will occur with the mode of operation for the UE 108 output by the machine learning model 152.

In order to reliably predict the mode of operation for the UEs 108, the machine learning model 152 is trained in order to determine the weights/coefficients using supervised learning prior to operation. In some examples, real-world time data, traffic data, signal quality data, and other data from the UEs are used for the independent variables and synthetic (non-real world) predicted mode of operation data is generated for dependent variables. In some examples, the real-world time data, traffic data, and signal quality data can be obtained with sensors distributed throughout the cell to generate measured time data and traffic data that is used for training. In some examples, the weights/coefficients are determined using an iterative procedure or other supervised learning training techniques. In some examples, the objective for training the machine learning model 152 is to maximize performance of the UE 108 given the current utilization data for the radio access network 100, 120, 160.

Once the machine learning model 152 is trained, the machine learning computing system 150 is configured to use the time data and the traffic data as inputs for the machine learning model 152 and determine a predicted mode of operation 156 for the UE 108. In examples where signal quality data and/or other information from the UE 108 is provided to the machine learning computing system 150, the predicted mode of operation 156 for the UE 108 can be determined based on those factors as well. In some examples, the machine learning computing system 150 is configured to perform additional learning during operation and adapt the weights/coefficients based on real world time data, traffic data, signal quality data, other information from the UE, and one or more performance indicators (for example, quality of service, etc.) for the radio access network 100, 120, 160.

In some examples, the number of independent variables of the machine learning model 152 can be selected during training based on the desired level of accuracy and computational load demands for the machine learning model 152. In theory, a greater number of independent variables for the time data and the traffic data can provide a more accurate prediction of the mode of operation for the UE 108 assuming that the machine learning model 152 is sufficiently trained.

In some examples, the number of possible distinct outputs of the machine learning model 152 corresponds to the number of distinct modes of dual connectivity and modes of carrier aggregation for operation of the UE 108. Some factors that can be used to determine the number of distinct outputs can include the capabilities of the UEs, system capabilities, and the like.

While a single machine learning model 152 may provide sufficient accuracy for most applications, it may be desirable or necessary to increase the accuracy of the predicted mode of operation 156 for the UE 108. One potential approach for increasing the accuracy of the predicted mode of operation 156 for the UE 108 is to use multiple machine learning models 152 that are each specific to a subset of the time data and/or the traffic data. This approach can reduce the number of independent variables, which reduces the complexity of the predictor function and can result in reduced computational load and/or increased accuracy of the output.

In some examples, multiple machine learning models 152 directed to specific subsets of the time data are utilized by the machine learning computing system 150. In some such examples, each respective machine learning model 152 is directed to a particular time of day (for example, morning, afternoon, or evening). In other such examples, each respective machine learning model 152 is directed to a particular day of the week (for example, Monday, Tuesday, etc.) or grouped day of the week (for example, weekdays or weekends). In other such examples, each respective machine learning model 152 is directed to a particular holiday status (for example, holiday or non-holiday).

In some examples, multiple machine learning models 152 directed to specific subsets of the traffic data are utilized by the machine learning computing system 150. In some such examples, each respective machine learning model 152 is directed to a specific carrier or operator and uses only traffic data for that specific carrier or operator as an input.

Figure 3:
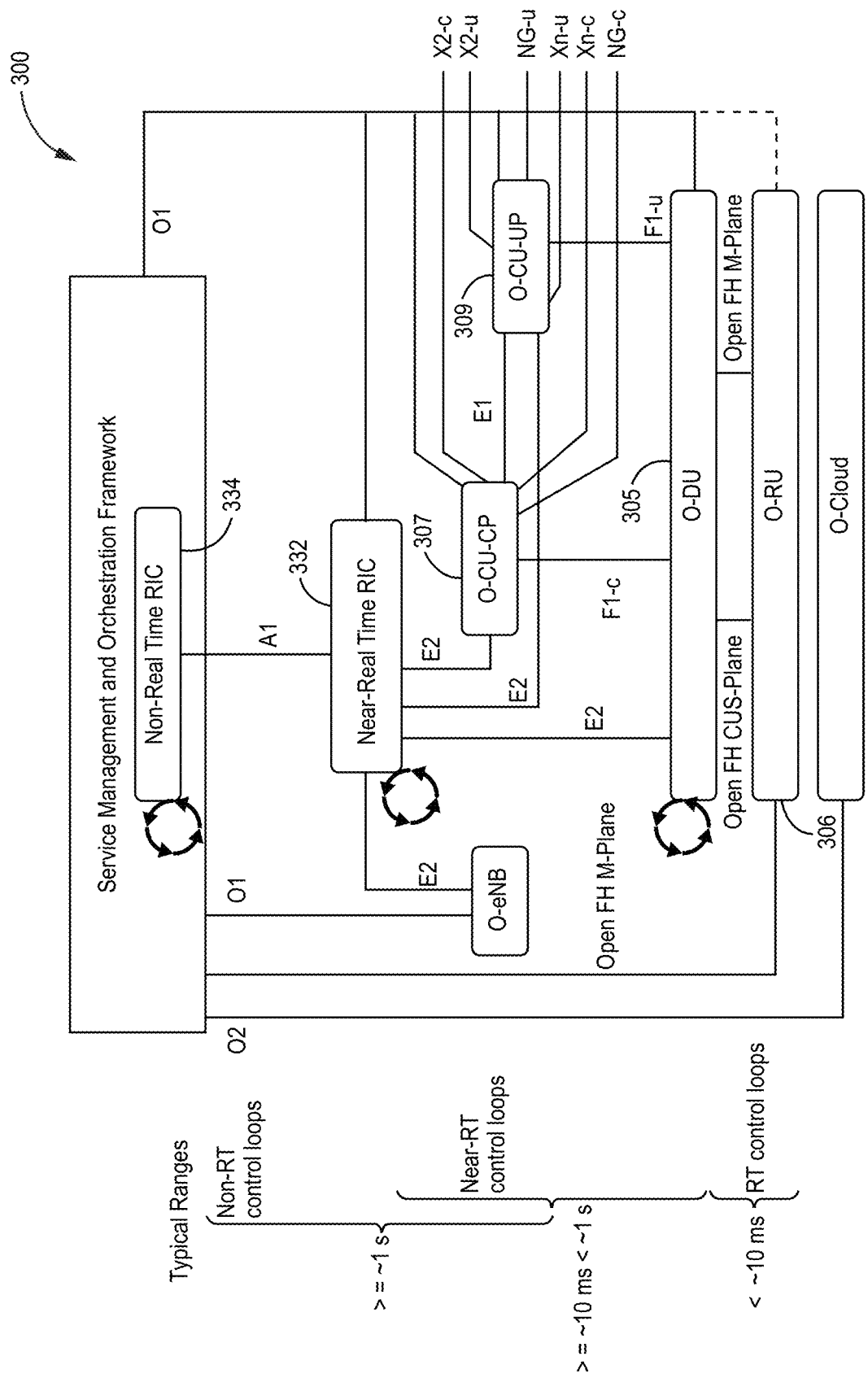
FIG. 3 is a block diagram illustrating an example radio access network.

FIG. 3 is a block diagram illustrating an example radio access network 300 in which the techniques for radio resource usage described herein can be implemented. In the particular example shown in FIG. 3, the radio access network 300 includes one or more central units (CUs), one or more distributed units (DUs), and one or more radio units (RUs). Each RU is located remotely from each CU and DU serving it.

The radio access network 300 is implemented in accordance with one or more public standards and specifications. In some examples, the radio access network 300 is implemented using the logical RAN nodes, functional splits, and front-haul interfaces defined by the Open Radio Access Network (O-RAN) Alliance. In the example shown in FIG. 3, each CU, DU, and RU is implemented as an O-RAN central unit (O-CU), O-RAN distributed unit (O-DU) 305, and O-RAN radio unit (O-RU) 306, respectively, in accordance with the O-RAN specification.

In the example shown in FIG. 3, the radio access network 300 includes a single O-CU, which is split between an O-CU-CP 307 that handles control plane functions and an O-CU-UP 309 that handles user plane functions. The O-CU comprises a logical node hosting Packet Data Convergence Protocol (PDCP), Radio Resource Control (RRC), Service Data Adaptation Protocol (SDAP), and other control functions. Therefore, each O-CU implements the gNB controller functions such as the transfer of user data, mobility control, radio access network sharing, positioning, session management, etc. The O-CU(s) control the operation of the O-DUs 305 over an interface (including F1-c and F1-u for the control plane and user plane, respectively).

In the example shown in FIG. 3, the single O-CU handles control plane functions, user plane functions, some non-real-time functions, and/or PDCP processing. The O-CU-CP 307 may communicate with at least one wireless service provider's Next Generation Cores (NGC) using a 5G NG-C interface and the O-CU-UP 309 may communicate with at least one wireless service provider's NGC using a 5G NG-U interface.

Each O-DU 305 comprises a logical node hosting (performing processing for) Radio Link Control (RLC) and Media Access Control (MAC) layers, as well as optionally the upper or higher portion of the Physical (PHY) layer (where the PHY layer is split between the DU and RU). In other words, the O-DUs 305 implement a subset of the gNB functions, depending on the functional split (between O-CU and O-DU 305). In some configurations, the Layer-3 processing (of the 5G air interface) may be implemented in the O-CU and the Layer-2 processing (of the 5G air interface) may be implemented in the O-DU 305.

The O-RU 306 comprises a logical node hosting the portion of the PHY layer not implemented in the O-DU 305 (that is, the lower portion of the PHY layer) as well as implementing the basic RF and antenna functions. In some examples, the O-RUs 306 may communicate baseband signal data to the O-DUs 305 on Open Fronthaul CUS-Plane or Open Fronthaul M-plane interface. In some examples, the O-RU 306 may implement at least some of the Layer-1 and/or Layer-2 processing. In some configurations, the O-RUs 306 may have multiple ETHERNET ports and can communicate with multiple switches.

Although the O-CU (including the O-CU-CP 307 and O-CU-UP 309), O-DU 305, and O-RUs 306 are described as separate logical entities, one or more of them can be implemented together using shared physical hardware and/or software. For example, in the example shown in FIG. 3, for each cell, the O-CU (including the O-CU-CP 307 and O-CU-UP 309) and O-DU 305 serving that cell could be physically implemented together using shared hardware and/or software, whereas each O-RU 306 would be physically implemented using separate hardware and/or software. Alternatively, the O-CU(s) (including the O-CU-CP 307 and O-CU-UP 309) may be remotely located from the O-DU(s) 305.

In the example shown in FIG. 3, the radio access network 300 further includes a non-real time RAN intelligent controller (RIC) 334 and a near-real time RIC 332. The non-real time RIC 334 and the near-real time RIC 332 are separate entities in the O-RAN architecture and serve different purposes. In some examples, the non-real time RIC 334 is implemented as a standalone application in a cloud network. In other examples, the non-real time RIC 334 is integrated with a Device Management System (DMS) or Service Orchestration (SO) tool. In some examples, the near-real time RIC 332 is implemented as a standalone application in a cloud network. In other examples, the near-real time RIC 332 is embedded in the O-CU. The non-real time RIC 334 and/or the near-real time RIC 332 can also be deployed in other ways.

The non-real time RIC 334 is responsible for non-real time flows in the system (typically greater than or equal to 1 second) and configured to execute one or more machine learning models, which are also referred to as "rApps." The near-real time RIC 332 is responsible for near-real time flows in the system (typically 10 ms to 1 second) and configured to execute one or more machine learning models, which are also referred to as "xApps."

In some examples, the near-real time RIC 332 shown in FIG. 3 can be configured to operate in a manner similar to the machine learning computing system 150 described above with respect to FIGS. 1A-2. In some such examples, the functionality of the machine learning computing system 150 is implemented as an xApp that is configured to run on the near-real time RIC 332. The near-real time RIC 332 is configured to predict the mode of operation for the UE 108 in a manner similar to that described above, and the radio access network 300 is configured to select a mode of operation for UEs based on the predicted mode of operation.

Figure 4:
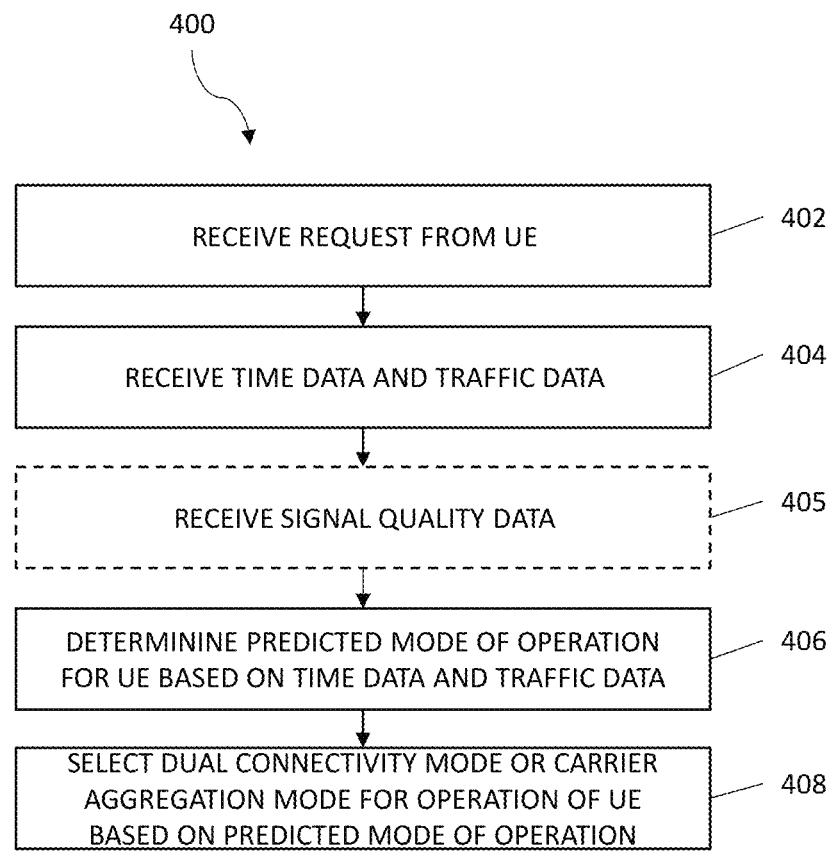
FIG. 4 is a flow diagram illustrating an example method of dynamically selecting a mode of operation for user equipment.

FIG. 4 is a flow diagram of an example method 400 for machine learning based dynamic selection of dual connectivity or carrier aggregation for a UE. The common features discussed above with respect to the radio access networks in FIGS. 1A-3 can include similar characteristics to those discussed with respect to method 400 and vice versa. In some examples, the method 400 is performed by a base station (for example, in radio access network 100, 120, 160, 300).

The blocks of the sequence diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner).

The method 400 begins with receiving time data and traffic data (block 402). In some examples, the time data includes the current time of day, the current day of the week, and/or whether the current day is a holiday. In some examples, the traffic data includes utilization data for LTE and/or NR resources. In some examples, the traffic data includes a number of radio access bearers in use or traffic related information.

The method 400 includes receiving a request from a user equipment (block 404). In some examples, the request from the user equipment is a request for service provided to the base station. In some examples, the request from the user equipment includes an indication of a type of application used by the user equipment and a quality of service required by the user equipment.

The method 400 optionally includes receiving signal quality data (block 405). In some examples, the signal quality data is received by the machine learning computing system from the user equipment via one or more components of the base station. In some examples, the signal quality data includes a signal-to-interference-plus-noise ratio (SINR) measurement, a received signal strength indicator (RSSI) measurement, or another measurement of signal quality at the user equipment.

The method 400 includes determining a predicted mode of operation for the user equipment based on the time data and the traffic data (block 406). In some examples, predicting the mode of operation for the UE includes predicting a dual connectivity mode or a carrier aggregation mode. Depending on the capabilities/characteristics of the radio access network, the dual connectivity mode can be EN-DC, NGEN-DC, NE-DC, or NR-DC. Also, depending on the capabilities/characteristics of the radio access network, the carrier aggregation mode can include LTE and/or NR carrier aggregation. The predicted mode of operation for the UE is determined using one or more machine learning models in a manner similar to that discussed above. In some examples, determining the predicted mode of operation for the user equipment is also based the signal quality data and/or information in the request from the user equipment.

The method 400 includes selecting a dual connectivity mode or a carrier aggregation mode for operation of the user equipment based on the predicted radio resource usage (block 408). In some examples, one or more components of the radio access network are configured to implement a connection with the user equipment using the mode of operation that corresponds to the predicted mode of operation.

Other examples are implemented in other ways.

The systems and methods described herein dynamically select a dual connectivity mode or carrier aggregation mode for operation of a user equipment based on real-time patterns and needs. The systems and methods described herein account for how the radio access network resources are being used and the different quality of service needs for applications used by user equipment. The systems and methods described herein better utilize resources and improve performance for user equipment for use cases and applications that require enhanced performance compared to current techniques that rely on static configurations or dynamic selection based on non-real time parameters.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a system, comprising: at least one baseband unit (BBU); one or more radio units communicatively coupled to the at least one BBU; one or more antennas communicatively coupled to the one or more radio units, wherein each respective radio unit of the one or more radio units is communicatively coupled to a respective subset of the one or more antennas; wherein the at least one BBU, the one or more radio units, and the one or more antennas are configured to implement a base station for wirelessly communicating with user equipment; and a machine learning computing system configured to: receive time data and traffic data; and determine a predicted mode of operation for a first user equipment based on the time data and the traffic data; wherein one or more components of the system are configured to: receive a request from the first user equipment; and dynamically select a dual connectivity mode or a carrier aggregation mode for operation of the first user equipment based on the predicted mode of operation for the first user equipment.

Example 2 includes the system of Example 1, wherein the time data and traffic data includes: time of day; day of week; and a utilization of resources of the base station.

Example 3 includes the system of any of Examples 1-2, wherein machine learning computing system is further configured to receive signal quality data, wherein the machine learning computing system is configured to determine the predicted mode of operation for the first user equipment based on the time data, the traffic data, and the signal quality data.

Example 4 includes the system of any of Examples 1-3, wherein the dual connectivity mode is one of: Evolved-Universal Terrestrial Radio Access-New Radio Dual Connectivity (EN-DC); Next Generation Radio Access Network New Radio-Evolved-Universal Terrestrial Radio Access Dual Connectivity (NGEN-DC); New Radio-Evolved-Universal Terrestrial Radio Access Dual Connectivity (NE-DC); or New Radio-New Radio Dual Connectivity (NR-DC); and wherein the carrier aggregation mode includes: 4G LTE carrier aggregation; and/or 5G NR carrier aggregation.

Example 5 includes the system of any of Examples 1-4, wherein the request from the first user equipment includes an indication of a type of application used by the first user equipment and a quality of service needed by the first user equipment, wherein the machine learning computing system is configured to determine the predicted mode of operation for the first user equipment based on the time data, the traffic data, the type of application used by the first user equipment, and the quality of service needed by the first user equipment.

Example 6 includes the system of any of Examples 1-5, wherein the machine learning computing system is configured to utilize the time data and the traffic data as inputs to a plurality of machine learning models, wherein each machine learning model of the plurality of machine learning models is directed to a specific carrier and/or a specific operator.

Example 7 includes the system of any of Examples 1-6, wherein the one or more radio units includes a plurality of radio units, wherein the one or more antennas includes a plurality of antennas.

Example 8 includes the system of any of Examples 1-7, wherein the BBU includes a central unit communicatively coupled to a distributed unit, wherein the distributed unit is communicatively coupled to the one or more radio units, wherein the machine learning computing system is implemented in a radio access network intelligent controller.

Example 9 includes a method, comprising: receiving time data and traffic data; receiving a request from a first user equipment at a base station, wherein the base station includes at least one baseband unit (BBU), one or more radio units communicatively coupled to the at least one BBU, and one or more antennas communicatively coupled to the one or more radio units, wherein each respective radio unit of the one or more radio units is communicatively coupled to a respective subset of the one or more antennas, wherein the at least one BBU, the one or more radio units, and the one or more antennas are configured to implement the base station for wirelessly communicating with the first user equipment; determining a predicted mode of operation for the first user equipment based on the time data and the traffic data; and selecting a dual connectivity mode or a carrier aggregation mode for operation of the first user equipment based on the predicted mode of operation for the first user equipment.

Example 10 includes the method of Example 9, wherein the time data and traffic data includes: time of day; day of week; and a utilization of resources of the base station.

Example 11 includes the method of any of Examples 9-10, further comprising receiving signal quality data, wherein the method includes determining the predicted mode of operation of the first user equipment based on the time data, the traffic data, and the signal quality data.

Example 12 includes the method of any of Examples 9-11, wherein the dual connectivity mode is one of: Evolved-Universal Terrestrial Radio Access-New Radio Dual Connectivity (EN-DC); Next Generation Radio Access Network New Radio-Evolved-Universal Terrestrial Radio Access Dual Connectivity (NGEN-DC); New Radio-Evolved-Universal Terrestrial Radio Access Dual Connectivity (NE-DC); or New Radio-New Radio Dual Connectivity (NR-DC); and wherein the carrier aggregation mode includes: 4G LTE carrier aggregation; and/or 5G NR carrier aggregation.

Example 13 includes the method of any of Examples 9-12, wherein the request from the first user equipment includes an indication of a type of application used by the first user equipment and a quality of service needed by the first user equipment, wherein the method includes determining the predicted mode of operation of the first user equipment based on the time data, the traffic data, the type of application used by the first user equipment, and the quality of service needed by the first user equipment.

Example 14 includes a radio access network, comprising: a first base station including a first baseband unit (BBU); a second base station including a second baseband unit (BBU); one or more radio units communicatively coupled to the first BBU and the second BBU; one or more antennas communicatively coupled to the one or more radio units, wherein each respective radio unit of the one or more radio units is communicatively coupled to a respective subset of the one or more antennas; and a machine learning computing system configured to: receive time data and traffic data; and determine a predicted mode of operation for a first user equipment based on the time data and the traffic data; wherein one or more components of the radio access network are configured to: receive a request from the first user equipment; and dynamically select a dual connectivity mode or a carrier aggregation mode for the first user equipment based on the predicted mode of operation for the first user equipment.

Example 15 includes the radio access network of Example 14, wherein the first base station is an LTE base station, wherein the second base station is a 5G base station, wherein the dual connectivity mode is Evolved-Universal Terrestrial Radio Access-New Radio Dual Connectivity (EN-DC), wherein the carrier aggregation mode includes 4G LTE carrier aggregation and/or 5G NR carrier aggregation.

Example 16 includes the radio access network of Example 14, wherein the first base station is an LTE base station, wherein the second base station is a 5G base station, wherein the dual connectivity mode is Next Generation Radio Access Network New Radio-Evolved-Universal Terrestrial Radio Access Dual Connectivity (NGEN-DC), wherein the carrier aggregation mode includes 4G LTE carrier aggregation and/or 5G NR carrier aggregation.

Example 17 includes the radio access network of Example 14, wherein the first base station is an LTE base station, wherein the second base station is a 5G base station, wherein the dual connectivity mode is New Radio-Evolved-Universal Terrestrial Radio Access Dual Connectivity (NE-DC), wherein the carrier aggregation mode includes 4G LTE carrier aggregation and/or 5G NR carrier aggregation.

Example 18 includes the radio access network of Example 14, wherein the first base station is a 5G base station, wherein the second base station is a 5G base station, wherein the dual connectivity mode is New Radio-New Radio Dual Connectivity (NR-DC), wherein the carrier aggregation mode is 5G NR carrier aggregation.

Example 19 includes the radio access network of any of Examples 14-18, wherein the request from the first user equipment includes an indication of a type application used by the first user equipment and a quality of service needed by the first user equipment, wherein the machine learning computing system is configured to determine the predicted mode of operation for the first user equipment based on the time data, the traffic data, the type application used by the first user equipment, and the quality of service needed by the first user equipment.

Example 20 includes the radio access network of any of Examples 14-19, wherein machine learning computing system is further configured to receive signal quality data, wherein the machine learning computing system is configured to determine the predicted mode of operation for the first user equipment based on the time data, the traffic data, and the signal quality data.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A system, comprising:
   at least one baseband unit (BBU);
   one or more radio units communicatively coupled to the at least one BBU;
   one or more antennas communicatively coupled to the one or more radio units, wherein each respective radio unit of the one or more radio units is communicatively coupled to a respective subset of the one or more antennas;
   wherein the at least one BBU, the one or more radio units, and the one or more antennas are configured to implement a base station for wirelessly communicating with user equipment; and
   a machine learning computing system configured to:
      receive time data and traffic data; and
      determine a predicted mode of operation for a first user equipment based on the time data and the traffic data;
   wherein one or more components of the system are configured to:
      receive a request from the first user equipment; and
      dynamically select a dual connectivity mode or a carrier aggregation mode for operation of the first user equipment based on the predicted mode of operation for the first user equipment.

2. The system of claim 1, wherein the time data and traffic data includes:
   time of day;
   day of week; and
   a utilization of resources of the base station.

3. The system of claim 1, wherein machine learning computing system is further configured to receive signal quality data, wherein the machine learning computing system is configured to determine the predicted mode of operation for the first user equipment based on the time data, the traffic data, and the signal quality data.

4. The system of claim 1,
   wherein the dual connectivity mode is one of:
      Evolved-Universal Terrestrial Radio Access-New Radio Dual Connectivity (EN-DC);
      Next Generation Radio Access Network New Radio-Evolved-Universal Terrestrial Radio Access Dual Connectivity (NGEN-DC);
      New Radio-Evolved-Universal Terrestrial Radio Access Dual Connectivity (NE-DC); or
      New Radio-New Radio Dual Connectivity (NR-DC); and
   wherein the carrier aggregation mode includes:
      4G LTE carrier aggregation; and/or
      5G NR carrier aggregation.

5. The system of claim 1, wherein the request from the first user equipment includes an indication of a type of application used by the first user equipment and a quality of service needed by the first user equipment, wherein the machine learning computing system is configured to determine the predicted mode of operation for the first user equipment based on the time data, the traffic data, the type of application used by the first user equipment, and the quality of service needed by the first user equipment.

6. The system of claim 1, wherein the machine learning computing system is configured to utilize the time data and the traffic data as inputs to a plurality of machine learning models, wherein each machine learning model of the plurality of machine learning models is directed to a specific carrier and/or a specific operator.

7. The system of claim 1, wherein the one or more radio units includes a plurality of radio units, wherein the one or more antennas includes a plurality of antennas.

8. The system of claim 1, wherein the BBU includes a central unit communicatively coupled to a distributed unit, wherein the distributed unit is communicatively coupled to the one or more radio units, wherein the machine learning computing system is implemented in a radio access network intelligent controller.

9. A method, comprising:
   receiving time data and traffic data;
   receiving a request from a first user equipment at a base station, wherein the base station includes at least one baseband unit (BBU), one or more radio units communicatively coupled to the at least one BBU, and one or more antennas communicatively coupled to the one or more radio units, wherein each respective radio unit of the one or more radio units is communicatively coupled to a respective subset of the one or more antennas, wherein the at least one BBU, the one or more radio units, and the one or more antennas are configured to implement the base station for wirelessly communicating with the first user equipment;
   determining a predicted mode of operation for the first user equipment based on the time data and the traffic data; and
   selecting a dual connectivity mode or a carrier aggregation mode for operation of the first user equipment based on the predicted mode of operation for the first user equipment.

10. The method of claim 9, wherein the time data and traffic data includes:
    time of day;
    day of week; and
    a utilization of resources of the base station.

11. The method of claim 9, further comprising receiving signal quality data, wherein the method includes determining the predicted mode of operation of the first user equipment based on the time data, the traffic data, and the signal quality data.

12. The method of claim 9,
    wherein the dual connectivity mode is one of:
       Evolved-Universal Terrestrial Radio Access-New Radio Dual Connectivity (EN-DC);
       Next Generation Radio Access Network New Radio-Evolved-Universal Terrestrial Radio Access Dual Connectivity (NGEN-DC);
       New Radio-Evolved-Universal Terrestrial Radio Access Dual Connectivity (NE-DC); or
       New Radio-New Radio Dual Connectivity (NR-DC); and
    wherein the carrier aggregation mode includes:
       4G LTE carrier aggregation; and/or
       5G NR carrier aggregation.

13. The method of claim 9, wherein the request from the first user equipment includes an indication of a type of application used by the first user equipment and a quality of service needed by the first user equipment, wherein the method includes determining the predicted mode of operation of the first user equipment based on the time data, the traffic data, the type of application used by the first user equipment, and the quality of service needed by the first user equipment.

14. A radio access network, comprising:
    a first base station including a first baseband unit (BBU);
    a second base station including a second baseband unit (BBU);

one or more radio units communicatively coupled to the first BBU and the second BBU;
one or more antennas communicatively coupled to the one or more radio units, wherein each respective radio unit of the one or more radio units is communicatively coupled to a respective subset of the one or more antennas; and
a machine learning computing system configured to:
   receive time data and traffic data; and
   determine a predicted mode of operation for a first user equipment based on the time data and the traffic data;
wherein one or more components of the radio access network are configured to:
   receive a request from the first user equipment; and
   dynamically select a dual connectivity mode or a carrier aggregation mode for the first user equipment based on the predicted mode of operation for the first user equipment.

15. The radio access network of claim 14, wherein the first base station is an LTE base station, wherein the second base station is a 5G base station, wherein the dual connectivity mode is Evolved-Universal Terrestrial Radio Access-New Radio Dual Connectivity (EN-DC), wherein the carrier aggregation mode includes 4G LTE carrier aggregation and/or 5G NR carrier aggregation.

16. The radio access network of claim 14, wherein the first base station is an LTE base station, wherein the second base station is a 5G base station, wherein the dual connectivity mode is Next Generation Radio Access Network New Radio-Evolved-Universal Terrestrial Radio Access Dual Connectivity (NGEN-DC), wherein the carrier aggregation mode includes 4G LTE carrier aggregation and/or 5G NR carrier aggregation.

17. The radio access network of claim 14, wherein the first base station is an LTE base station, wherein the second base station is a 5G base station, wherein the dual connectivity mode is New Radio-Evolved-Universal Terrestrial Radio Access Dual Connectivity (NE-DC), wherein the carrier aggregation mode includes 4G LTE carrier aggregation and/or 5G NR carrier aggregation.

18. The radio access network of claim 14, wherein the first base station is a 5G base station, wherein the second base station is a 5G base station, wherein the dual connectivity mode is New Radio-New Radio Dual Connectivity (NR-DC), wherein the carrier aggregation mode is 5G NR carrier aggregation.

19. The radio access network of claim 14, wherein the request from the first user equipment includes an indication of a type application used by the first user equipment and a quality of service needed by the first user equipment, wherein the machine learning computing system is configured to determine the predicted mode of operation for the first user equipment based on the time data, the traffic data, the type application used by the first user equipment, and the quality of service needed by the first user equipment.

20. The radio access network of claim 14, wherein machine learning computing system is further configured to receive signal quality data, wherein the machine learning computing system is configured to determine the predicted mode of operation for the first user equipment based on the time data, the traffic data, and the signal quality data.

* * * * *